US009198191B2

(12) United States Patent
Wischhof et al.

(10) Patent No.: US 9,198,191 B2
(45) Date of Patent: Nov. 24, 2015

(54) METHOD FOR TRANSMITTING MESSAGES FROM A DATA NETWORK TO A VEHICLE AND SERVER DEVICE FOR A DATA NETWORK

(71) Applicant: AUDI AG, Ingolstadt (DE)

(72) Inventors: Lars Wischhof, Ingolstadt (DE); Thomas Rottach, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/352,481

(22) PCT Filed: Sep. 25, 2012

(86) PCT No.: PCT/EP2012/004007
§ 371 (c)(1),
(2) Date: Apr. 17, 2014

(87) PCT Pub. No.: WO2013/056781
PCT Pub. Date: Apr. 25, 2013

(65) Prior Publication Data

US 2014/0321366 A1 Oct. 30, 2014

(30) Foreign Application Priority Data

Oct. 18, 2011 (DE) ......................... 10 2011 116 247

(51) Int. Cl.
*H04W 4/00* (2009.01)
*H04W 72/12* (2009.01)
(Continued)

(52) U.S. Cl.
CPC ........... *H04W 72/1242* (2013.01); *H04L 51/14* (2013.01); *H04L 67/12* (2013.01); *H04L 67/325* (2013.01); *H04W 28/065* (2013.01); *H04L 51/38* (2013.01); *H04W 84/005* (2013.01)

(58) Field of Classification Search
None
See application file for complete search history.

(56) References Cited

U.S. PATENT DOCUMENTS 8,280,583 B2 10/2012 Stählin et al.
2004/0064734 A1 4/2004 Ehrlich
(Continued)

FOREIGN PATENT DOCUMENTS

DE 102004052075 4/2006
DE 102008061304 7/2009
(Continued)

OTHER PUBLICATIONS

WIPO English Language Translation of the International Preliminary Report on Patentability for PCT/EP2012/004007, mailed Apr. 24, 2014, 7 pages.
(Continued)

*Primary Examiner* — Kwang B Yao
*Assistant Examiner* — Adam Duda
(74) *Attorney, Agent, or Firm* — Staas & Halsey LLP

(57) ABSTRACT

A method ensures that message traffic runs smoothly during the transmission of messages from a plurality of data sources in a data network to a vehicle connected to the data network via a mobile radio interface. Messages are sent out to the vehicle from a plurality of data sources in a data network, in particular the Internet, and the messages are not delivered directly to the vehicle, but rather to a server device of the data network, where the messages are each assigned one of a plurality of predetermined message classes by the server device and messages of a first message class are immediately transferred to the vehicle by the server device, messages of a second message class are saved in the server device and messages of a third message class are deleted. A server device coupled to a data network works with the method.

20 Claims, 1 Drawing Sheet

(51) Int. Cl.

| | |
|---|---|
| ***H04L 29/08*** | (2006.01) |
| ***H04W 28/06*** | (2009.01) |
| *H04L 12/58* | (2006.01) |
| *H04W 84/00* | (2009.01) |

(56) References Cited

U.S. PATENT DOCUMENTS

| | | | |
|---|---|---|---|
| 2004/0143636 | A1 | 7/2004 | Horvitz et al. |
| 2006/0088044 | A1 | 4/2006 | Hammerl |
| 2007/0142990 | A1 | 6/2007 | Moughler et al. |
| 2009/0047929 | A1 | 2/2009 | Chesnutt et al. |

FOREIGN PATENT DOCUMENTS

| | | |
|---|---|---|
| DE | 102011116247.3 | 10/2011 |
| EP | PCT/EP2012/004007 | 9/2012 |
| WO | 2007/044881 | 4/2007 |

OTHER PUBLICATIONS

English Language International Search Report for PCT/EP2012/004007, mailed Mar. 25, 2013, 3 pages.

German Office Action for German Priority Patent Application No. 10 2011 116 247.3, issued on Jul. 30, 2012, 11 pages.

German Decision to Grant for German Priority Patent Application No. 10 2011 116 247.3, issued on Dec. 17, 2012, 9 pages.

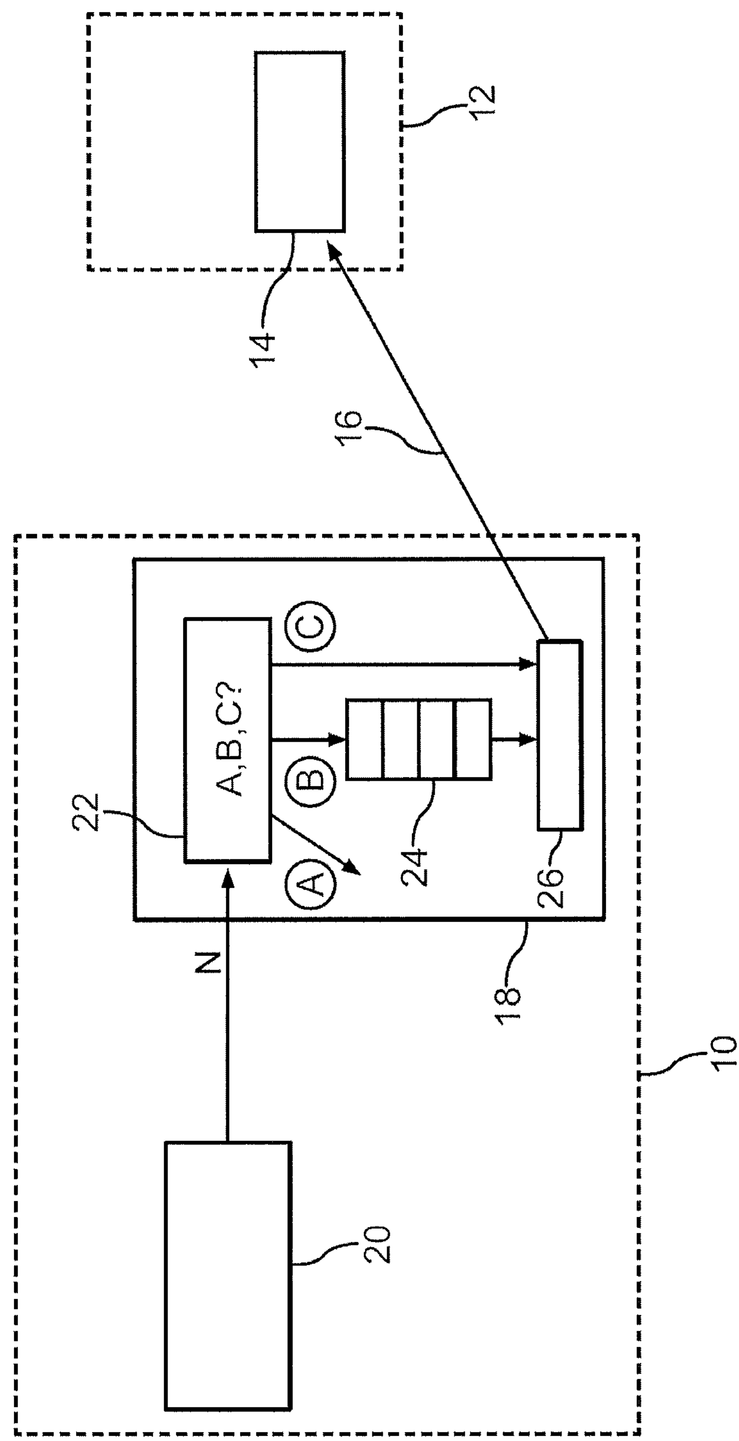
12
14
16
10
18
20
22
24
26
N
A,B,C?
A
B
C

METHOD FOR TRANSMITTING MESSAGES FROM A DATA NETWORK TO A VEHICLE AND SERVER DEVICE FOR A DATA NETWORK

CROSS REFERENCE TO RELATED APPLICATIONS

This application is based on and hereby claims priority to International Application No. PCT/EP2012/004007 filed on Sep. 25, 2012 and German Application No. 10 2011 116 247.3 filed on Oct. 18, 2011, the contents of which are hereby incorporated by reference.

BACKGROUND

The invention relates to a method which is used to emit messages from a multiplicity of data sources in a data network to a vehicle. The invention also includes a server device which can be coupled to a data network.

In the case of vehicles (road vehicles, for example automobiles and/or trucks), it is possible to set up a communication connection to a data network, for example the Internet, via a mobile radio interface using a mobile radio module even while traveling. As soon as such a data connection has been established, different devices of the vehicle or different computer programs executed by a computer device in the vehicle can then set up network connections to servers in the data network. If a connection to an Internet provider (ISP—Internet Service Provider) is established using a UMTS mobile radio connection (UMTS—Universal Mobile Telecommunication System) for example, the Internet provider can assign an Internet address to the mobile radio module or a gateway or router of the vehicle connected downstream of said mobile radio module. The individual devices or programs can then interchange data with Internet servers independently of one another on the basis of this Internet address (IP address) and other protocols (TCP—Transfer Control Protocol, UDP—User Datagram Protocol and the like).

A data service which is particularly important in connection with vehicles and can be provided in a data network is the transmission of current traffic data or data relating to a state of a road. For this purpose, it is known practice to determine such data with the aid of vehicles in the traffic which transmit their current travel speed and friction values of a road surface, which are determined using an ESP (ESP—Electronic Stabilization Program) for example, to corresponding servers in the data network. The collected data are then distributed by the server to the vehicles again, with the result that the information relating to the current traffic situation and the instantaneous state of the roads becomes available in each vehicle.

The transmission of data between a (stationary) network service provider, on the one hand, and a vehicle, on the other hand, which is enabled using a mobile radio interface, is naturally band-limited, that is to say only a limited number of data items can be transmitted in a predetermined interval of time. However, since it is possible for individual devices and programs to maintain data connections to network servers independently of one another, it is not possible to predict whether a bottleneck cannot result during data transmission. If this situation occurs once, this may even endanger the safety of the vehicle occupants. If, for example, the bandwidth of the mobile radio interface is used completely to transmit film data relating to a feature film which is played back in the vehicle, this may result in delays in the transmission of more important data, for example traffic data or warnings of black ice.

DE 10 2008 061 304 A1 discloses a communication device for a vehicle for wirelessly transmitting data which are relevant to the vehicle, which device comprises two communication units. A first unit is used to transmit first data and the second unit is used to transmit selected second data to the vehicle. The decision regarding which of the units data are transmitted to is made in this case on the basis of a priority of the data. In addition, the communication units may be designed in such a manner that, upon receiving data, they decide whether a received message is a message specifically intended for the vehicle or a general message for a multiplicity of vehicles. However, the disadvantage of this last aspect is that the data must first of all be transmitted via the radio interface before a decision can be made on their relevance.

SUMMARY

One potential object is to ensure that the message traffic runs smoothly when transmitting messages from a multiplicity of data sources in a data network to a vehicle connected to the data network via a mobile radio interface.

The inventors propose a method that starts from the problematic situation described at the outset in which the messages can be emitted from a multiplicity of (independent) data sources of a data network, for example the Internet, to a vehicle. In this case, a message is understood as meaning an item of information represented by one or more data packets. According to the proposal, these messages are now not supplied to the vehicle directly but rather to a server device of the data network. This server device then classifies the messages in terms of their relevance and urgency for the vehicle. In other words, each message is assigned to one of a plurality of predetermined message classes. In this case, messages in a first message class are immediately transmitted to the vehicle by the server device. In contrast, messages in a further, second message class are stored in the server device. They therefore do not block the transmission of the messages in the first message class. Finally, the method provides for a third message class to be provided and for messages which are assigned to the third message class to even be deleted.

The abovementioned server device may be, for example, part of a so-called IT backend (IT—Information Technology) for coordinating the data traffic between the data network and the vehicle. A corresponding server device which is suitable for use in such an IT backend is likewise proposed by the inventors. The server device comprises a network interface via which it can be coupled to a data network, that is to say the Internet for example. In this case, the server device is designed to receive messages for a particular vehicle via the network interface. These messages can then each be assigned to a predetermined message class by the server device on the basis of the vehicle and/or message. As already described, messages which have been assigned to a particular first message class are then immediately forwarded to the vehicle, messages in a second message class are buffered for the vehicle and messages in a third message class are deleted.

The method and the server device have the advantage that they can be used to deliberately inform a vehicle even if the different items of information are in the form of messages independently emitted by a plurality of message sources. This avoids the consumption of resources, for example transmission capacity of a mobile radio interface and computing power of a receiving system in the vehicle, as would otherwise result if non-relevant data were also transmitted at the same time as relevant data. For this purpose, the second message class can also be subdivided into subclasses in which the messages are then sorted in terms of their priority during transmission and/or the maximum permissible transmission delay.

In order to efficiently use the bandwidth of a radio channel to transmit messages to the vehicle, it has proved to be expedient to assign the message to the individual message classes on the basis of a property of the vehicle for which the messages are intended. Provision may therefore be made for the messages to be classified on the basis of a location at which the vehicle is currently located. This makes it possible to determine whether messages relating to traffic events at a location far away from the vehicle can be deleted, for example, because they have no influence on the progress of the vehicle. However, a planned travel route of the vehicle may also equally be used as a basis for classification. Messages relating to traffic events along the travel route can therefore be identified as being relevant to the vehicle. Therefore, those messages which inform the driver of traffic flow disturbances ahead in good time can be collated and transmitted to the vehicle. The messages can also be selected on the basis of an identity of a person in the vehicle. For example, if a person has a great interest in messages relating to a sporting event and has therefore entered a preferred delivery of messages relating to such sporting events in a corresponding user profile for an infotainment system, it is now possible to discern that a message should be forwarded to the vehicle if the person is in the vehicle.

Classification can also be effected on the basis of equipment of the vehicle. If the vehicle has, for example, an electronic stability program (ESP), the method of operation of which can be controlled by specifying known friction values of a road surface, it makes sense, for such a vehicle, to transmit messages relating to currently measured friction coefficients to said vehicle. Furthermore, classification can also be effected on the basis of currently active systems in the vehicle. If, for example, a person in the vehicle is currently using a data service, for instance a chat program, it is expedient to immediately forward corresponding chat messages to the vehicle so that this person is informed of notifications from other users.

In connection with assignment of the messages to the individual message classes on the basis of the vehicle, provision may finally also be made for the messages to be classified on the basis of messages which have already been previously transmitted to the vehicle. This prevents messages from being transmitted to the vehicle which cannot yet be processed at all by the vehicle at the transmission time because information without which the message cannot be meaningfully interpreted is still missing.

Instead of or in addition to the assignment on the basis of the vehicle, another development of the method provides for the messages to be assigned to the different classes on the basis of a type of message and/or contents of the message. Messages which, by their nature, are used to entertain the persons in the vehicle can therefore be withheld until messages relating to the safety of the persons, for example traffic messages, have been successfully delivered. Within a message type, it is then possible to also differentiate further by likewise using the contents of the message for classification.

The messages buffered by the server device should likewise be transmitted to the vehicle at a later time if the transmission channel is not being used to the full by messages to be transmitted immediately, for example. In this respect, one embodiment of the method provides for the server unit to check whether a predetermined emission criterion has been satisfied for a stored message. Such an emission criterion may be different, depending on how the method is specifically implemented. Examples of emission criteria are utilization of a transmission channel, expiry of a timer which is used to determine how long a message should be stored in the buffer of the server device, the reaching of a particular location by the vehicle and the activation of a particular system in the vehicle.

In connection with the stored messages to be subsequently sent, one expedient embodiment of the method provides for a plurality of stored messages to be combined and compressed to form a message bundle or a message packet. This compressed message packet can then be transmitted to the vehicle. Collective transmission of messages of relatively low urgency advantageously reduces the transmission overhead.

One preferred embodiment of the method provides for the server device to transmit messages to the vehicle as part of client/server communication without a request from the client, that is to say the vehicle here. This form of transmission is referred to as pushing below. Such a push method results in the advantage that messages identified by the server device as being particularly important can be forwarded to the vehicle without delay. The server device is not dependent on waiting for a request from the vehicle.

The inventors also propose developments of the server device which comprise features which have already been explained in connection with the developments of the method. For this reason, the features of the corresponding developments of the server device are not explained again here.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The FIGURE shows a vehicle which receives messages from a push server which is one embodiment of the server device.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The examples are described below are only potential embodiments.

The FIGURE shows an IT backend 10 which may be formed from one or more computers. The backend 10 collects information for a vehicle 12, on the basis of which information different functionalities are provided in the vehicle 12. In this case, the backend 10 regulates the data stream received by the vehicle 12. The vehicle 12 may be, for example, an automobile or a truck. The functionalities are provided in the vehicle 12 by individual service programs 14, only one of which is illustrated by way of example in the FIGURE. The service programs are executed by one or more control devices in the vehicle 12.

In order to transmit the information from the backend 10 to the vehicle 12, the backend 10 and the vehicle 12 are connected to one another via a communication connection 16. For example, provision may be made for a mobile radio module (not illustrated) of the vehicle 12 to be connected to an Internet service provider (ISP) via a mobile radio interface, for instance UMTS or LTE (Long Term Evolution). A communication device of the vehicle 12 can then have set up the communication connection 16 to the backend 10 as a TCP/IP connection (IP—Internet Protocol) on the basis of an Internet address assigned to the vehicle by the ISP. In this case, provision may be made for the data transmitted via the communication connection 16 to be encrypted, for example using the SSL method (SSL—Secure Socket Layer). In order to protect the vehicle 12 from external manipulation via a further data connection, provision may be made for the vehicle 12 to receive only those data which are received via the communication connection 16.

Inside the backend 10, the communication connection 16 is managed by a push server 18 of the backend 10. The push server 18 decides which information addressed to the vehicle 12 is actually transmitted via the communication connection 16. The push server 18 then transmits these data according to a push method, as described by the Bayeaux protocol for example. The push server 18 may be an individual device or else a plurality of devices. It is also possible to implement the entire push server 18 or parts of the latter as one or more service programs.

The information transmitted via the communication connection 16 is both traffic information and that information which is presented to the persons in the vehicle, for example by an infotainment system, that is to say messages, weather data, information from the Internet which the persons retrieve using a web browser or else chat or Facebook notifications, for example. The backend 10 receives this information from a data network, for example the Internet, via a router (not illustrated) of the backend 10. Another data source for information is further vehicles which are likewise connected to the backend 10 via communication connections similar to the communication connection 16. A data processing unit 20 collects this information from the vehicles and uses it to compile messages relating to a current state of road surfaces and relating to the traffic flow on different roads. For this purpose, the vehicles transmit information relating to their current speed and measured friction values, as determined by the anti-lock braking systems and electronic stabilization programs of the vehicles, as well as further operating parameters of the vehicles.

Since the bandwidth of the mobile radio interface via which the communication connection 16 has been established is limited, it is not possible to forward all of the data packets or messages produced from the Internet and by the device 20 at the same time to the vehicle 12 without delay via the communication connection 16 at any time. Since the computing capacity of the control devices in the vehicle 12 is also limited, the continuous pushing of messages would also load the vehicle with partially unnecessary or impermissible information, for example advertising or messages relating to the friction values of roads which are far away from the vehicle 12. In the FIGURE, the messages N which arrive at the push server 18 and are intended to be transmitted to the vehicle 12, only those which are produced by the device 20 are indicated.

In order to avoid "clogging" of the communication connection 16, the arriving messages, that is to say the messages to be pushed, are classified by the push server 18. In this case, classification criteria may be: the instantaneous location of the vehicle, an identity of the driver of the vehicle, a type of message, a type of application and/or systems active in the vehicle, the equipment of the vehicle, the information already present in the vehicle, as may have been already previously transmitted to the vehicle for instance, or a route of the vehicle. The messages N are classified by the push server 18 in terms of relevance and urgency for the vehicle in accordance with these classification criteria. In the example shown, the classification is based on three classes A, B, C. A decision-making unit 22 of the push server 18 decides which of the classes A, B, C a message N should be assigned to. Messages which are not relevant to the vehicle are discarded (class A). Messages with low urgency are collected in the push server 18 (class B). They are buffered in a memory 24 for this purpose. Relevant messages which should be delivered to the vehicle 12 with the shortest possible delay are immediately forwarded to a transmitting device 26 of the push server 18 by the decision-making unit 22.

The transmitting device 26 then forwards the messages to be sent to the vehicle 12 via the communication connection 16. The messages in the memory 24 are regularly checked by the push server 18 in order to determine whether they can likewise be forwarded to the vehicle 12. If a plurality of messages from the memory 24 are ready for transmission, provision may also be made for these messages to be collected and possibly to be delivered in compressed form.

The example shows how it is possible for a vehicle to receive data from different independent data sources via a radio interface without the radio network connection being overloaded in the process and possibly important messages not being able to be transmitted quickly enough.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method in which messages are transmitted to a vehicle from a multiplicity of data sources in a data network, comprising:

supplying the messages directly to a server device of the data network;

assigning each of the messages to one of a plurality of predetermined message classes by the server device;

immediately transmitting to the vehicle messages in a first message class by the server device;

storing messages in a second message class in the server device;

combining a plurality of stored messages in the second message class to form a message packet;

transmitting to the vehicle the message packet; and deleting messages in a third message class.

2. The method as claimed in claim 1, wherein the messages are assigned based on properties of the vehicle for which the messages are intended.

3. The method as claimed in claim 2, wherein the multiplicity of data sources comprise other vehicles, the server device receives from the other vehicles current traffic data and data relating to a state of a road, and the server device makes the current traffic data and the data relating to the state of the road available via the messages.

4. The method as claimed in claim 2, wherein assignment is effected based on at least one property of the vehicle selected from a group consisting of an instantaneous location of the vehicle, a planned travel route of the vehicle, an identity of persons in the vehicle, equipment of the vehicle, currently active applications and/or systems in the vehicle, and messages previously transmitted to the vehicle.

5. The method as claimed in claim 4, wherein assignment is effected based on messages previously transmitted to the vehicle, so as to prevent transmission of messages out of sequence.

6. The method as claimed claim 1, wherein the messages are assigned based on message type.

7. The method as claimed in claim 6, wherein the messages are assigned based on message type and based on message content.

8. The method as claimed in claim 1, wherein messages in the second message class are divided into subclasses whereby the messages are sorted based on message priority during transmission and/or maximum permissible transmission delay.

9. The method as claimed in claim 1, wherein for stored messages in the second message class, the server device checks whether a predetermined emission criterion has been satisfied for each stored message, and for each stored message, transmission is delayed or prevented by the server device if the predetermined emission criterion has not been satisfied.

10. The method as claimed in claim 9, wherein the predetermined emission criterion is at least one criterion selected from the group consisting of utilization of a transmission channel, expiry of a timer to determine how long a message should be stored in a server device buffer, the vehicle reaching a particular location and activation of a particular system of the vehicle.

11. The method as claimed in claim 1, wherein the plurality of stored messages are combined and compressed to form the message packet, and the message packet is transmitted to the vehicle as a compressed message packet.

12. The method as claimed in claim 1, wherein the server device transmits to the vehicle at least some of the messages in the first message class using a push method.

13. The method as claimed in claim 1, wherein the data network is part of the Internet.

14. The method as claimed in claim 1, wherein the vehicle is an automobile or truck.

15. The method as claimed in claim 1, wherein the multiplicity of data sources correspond to a multiplicity of data network connections, and in the vehicle, the multiplicity of data network connections correspond to different devices in the vehicle or to different computer programs executed by a computer device in the vehicle.

16. A server device which can be coupled to a data network via a network interface to receive messages for a vehicle, comprising:

a decision making unit:

to assign messages to one of a plurality of predetermined first, second and third message classes based in each case on properties of the vehicle and/or message type; and to delete messages in the third class;

a transmitter:

to immediately forward to the vehicle messages in the first message class; and to transmit to the vehicle a message packet containing a plurality of messages in the second message class; and a memory to buffer messages in the second message class, wherein after the messages in the second message class are buffered by the memory, the server device combines a plurality of messages in the second message class to form the message packet which the transmitter transmits to the vehicle.

17. The server device as claimed in claim 16, wherein the data network is part of the Internet, the vehicle includes:

a mobile radio module assigned an Internet address, and different devices or a computer containing different computer programs, and the different devices or the different computer programs use the mobile radio module to setup network connections to servers in the data network.

18. The server device as claimed in claim 17, wherein the different devices or the different computer programs interchange data with the servers independently of one another based on the Internet address assigned to the mobile radio module in the vehicle.

19. The server device as claimed in claim 16, wherein server device transmits the messages in encrypted format.

20. The server device as claimed in claim 16, wherein the server device is an individual device or a plurality of devices, and the server device transmits to the vehicle at least some of the messages in the first message class using a push method.

* * * * *